United States Patent
Deng et al.

(10) Patent No.: US 10,044,948 B2
(45) Date of Patent: Aug. 7, 2018

(54) IMAGE SENSOR GLOBAL SHUTTER SUPPLY CIRCUIT WITH VARIABLE BANDWIDTH

(71) Applicant: OMNIVISION TECHNOLOGIES, INC., Santa Clara, CA (US)

(72) Inventors: Liping Deng, Cupertino, CA (US); Zhiqiang Song, San Jose, CA (US); Pengting Zhang, Shanghai (CN); Yi Liu, Shanghai (CN)

(73) Assignee: OmniVision Technologies, Inc., Santa Clara, CA (US)

( * ) Notice: Subject to any disclaimer, the term of this patent is extended or adjusted under 35 U.S.C. 154(b) by 282 days.

(21) Appl. No.: 14/939,868

(22) Filed: Nov. 12, 2015

(65) Prior Publication Data

US 2017/0142356 A1 May 18, 2017

(51) Int. Cl.
*H04N 5/225* (2006.01)
*H04N 5/353* (2011.01)
*H04N 5/378* (2011.01)
*H04N 5/357* (2011.01)
*H04N 5/3745* (2011.01)

(52) U.S. Cl.
CPC ........... *H04N 5/3532* (2013.01); *H04N 5/353* (2013.01); *H04N 5/3577* (2013.01); *H04N 5/378* (2013.01); *H04N 5/37452* (2013.01)

(58) Field of Classification Search
None
See application file for complete search history.

(56) References Cited

U.S. PATENT DOCUMENTS

| | | | |
|---|---|---|---|
| 6,493,030 B1 * | 12/2002 | Kozlowski | H01L 27/14609 250/208.1 |
| 7,332,786 B2 | 2/2008 | Altice, Jr. et al. | |
| 2002/0109160 A1 * | 8/2002 | Mabuchi | H01L 27/14609 257/233 |
| 2004/0252211 A1 * | 12/2004 | Rhodes | H04N 5/335 348/308 |
| 2005/0068439 A1 * | 3/2005 | Kozlowski | H03F 3/005 348/308 |

(Continued)

OTHER PUBLICATIONS

ROC (Taiwan) Patent App. No. 105118963—Office Action with English Translation dated Jul. 31, 2017, 6 pages.

*Primary Examiner* — Twyler Lamb Haskins
*Assistant Examiner* — Dwight Alex C Tejano
(74) *Attorney, Agent, or Firm* — Christensen O'Connor; Johnson Kindness PLLC

(57) ABSTRACT

A pixel cell includes a photodiode to accumulate image charge. A global shutter transistor is coupled to the photodiode to reset the image charge in the photodiode in response to a global shutter control signal. A global shutter control signal generator circuit generates the global shutter control signal to have a first value signal or a second value signal. The first value signal is coupled to turn on the global shutter transistor to reset the photodiode. The second value signal controls the global shutter transistor to be in a low leakage off mode. A supply circuit is coupled to provide the second value signal to the global shutter control signal generator circuit. The supply circuit includes a variable filter circuit coupled to an output of the supply circuit to selectively vary a bandwidth of the second value signal in response to a bandwidth select signal.

22 Claims, 3 Drawing Sheets

(56) References Cited

U.S. PATENT DOCUMENTS

| | | | |
|---|---|---|---|
| 2007/0221823 A1* | 9/2007 | Xu | H01L 27/14609 |
| | | | 250/208.1 |
| 2008/0278605 A1* | 11/2008 | Hagihara | H04N 5/347 |
| | | | 348/234 |
| 2009/0236644 A1* | 9/2009 | Adkisson | G06F 17/5063 |
| | | | 257/292 |
| 2009/0302359 A1* | 12/2009 | Chen | H04N 5/3456 |
| | | | 257/292 |
| 2010/0231771 A1 | 9/2010 | Yaghmai | |
| 2010/0276574 A1* | 11/2010 | Manabe | H04N 5/353 |
| | | | 250/214 A |
| 2011/0221723 A1 | 9/2011 | Kurokawa et al. | |
| 2012/0105698 A1* | 5/2012 | Nomoto | H04N 3/155 |
| | | | 348/308 |
| 2015/0319386 A1 | 11/2015 | Brady et al. | |
| 2016/0037099 A1* | 2/2016 | Mandelli | H01L 27/14612 |
| | | | 348/241 |

\* cited by examiner

IMAGE SENSOR GLOBAL SHUTTER SUPPLY CIRCUIT WITH VARIABLE BANDWIDTH

BACKGROUND INFORMATION

Field of the Disclosure

The present invention relates generally to image sensors. More specifically, examples of the present invention are related to image sensor pixel cells having global shutters.

Background

For high-speed image sensors, a global shutter can be used to capture fast-moving objects. A global shutter typically enables all pixel cells in the image sensor to simultaneously capture the image. For slower moving objects, the more common rolling shutter is used. A rolling shutter normally captures the image in a sequence. For example, each row within a two-dimensional ("2D") pixel cell array may be enabled sequentially, such that each pixel cell within a single row captures the image at the same time, but each row is enabled in a rolling sequence. As such, each row of pixel cells captures the image during a different image acquisition window. For slow moving objects, the time differential between each row can generate image distortion. For fast-moving objects, a rolling shutter can cause a perceptible elongation distortion along the object's axis of movement.

In global shutter image sensor, all pixel cells are initialized with a reset voltage (e.g., AVDD) prior to starting a normal exposure operation. This reset is typically realized by connecting every pixel to an AVDD voltage through a global shutter switch. After reset, the global shutter switch in each pixel is turned off, which then enables each pixel to begin a normal exposure operation.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
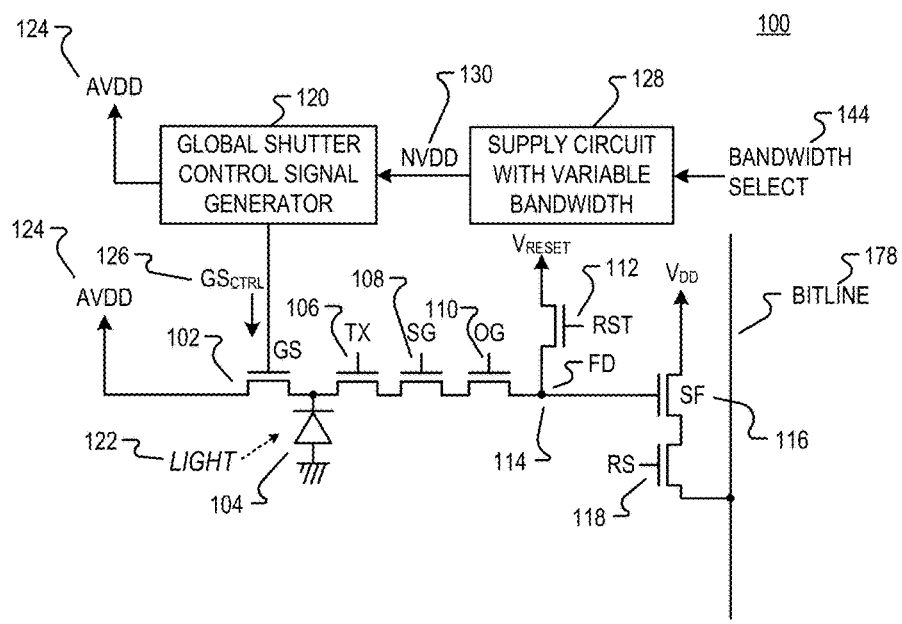
FIG. 1 is a schematic illustrating one example of a pixel cell including global shutter control signal generator coupled to receive a supply voltage from a supply circuit with variable bandwidth in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

As will be shown, methods and apparatuses directed to a global shutter control signal generator that provides a global shutter control signal to a global shutter switch in a pixel cell are disclosed. In the following description, numerous specific details are set forth in order to provide a thorough understanding of the present invention. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. The following is a detailed description of the terms and elements used in the description of examples of the present invention by referring to the accompanying drawings.

As will be discussed, for a global shutter switch that is implemented using an NMOS transistor, the gate terminal of the NMOS transistor can be connected to a negative NVDD voltage (e.g., −2 volts) to provide a low leakage off mode for the global shutter switch when the global shutter switch is turned off, which improves image sensor performance. As such, the NMOS gate voltage is changed from AVDD to NVDD when the global shutter switch transitions from being turned on to being turned off. For instance, in an example in which AVDD =3 volts and NVDD =−2 volts, the voltage on the gate terminal of the global shutter switch transitions from 3 volts to −2 volts when being turned off. In order to provide the negative NVDD voltage (e.g., −2 volts), a negative voltage generator, which may also be referred to as an N-pump or negative pump, is provided. In order to turn off the global shutter switch in every pixel cell of an image sensor simultaneously to implement a global shutter, a typical N-pump would need to have a very large driving capability in order to drive all of the gate terminals of the global shutter switches. Indeed, the line capacitance coupled to the gate terminals of all of the global shutter switches could be very large, which in some examples could be in the order of nanofarads depending on number of pixels in the pixel array of an image sensor.

In order to achieve a large driving capability with a fast settling times, a larger loop bandwidth is required of an N-pump circuit that supplies the negative NVDD voltage to the gate terminals of all of the global shutter transistors in the image sensor. However, supplying the negative NVDD voltage with the larger bandwidth generally results in increased noise as a consequence. As will be discussed in greater detail below, examples in accordance with the teachings of the present invention solve this problem of the need of a negative NVDD voltage supply circuit with large driving capability and low noise.

As will be shown, instead of fixed low pass filter bandwidth, a large bandwidth is provided with a variable low pass filter during a first portion of time of when the gate terminal of an NMOS global shutter transistor is initially coupled to a negative NVDD voltage to provide a fast settling time. After the negative NVDD voltage on the gate terminal of the NMOS global shutter transistor has substantially settled, the bandwidth on the variable low pass filter is decreased to reduce the noise and ripple on the gate of the global shutter transistor during a second portion of time of when the gate terminal of the global shutter transistor is coupled to the negative NVDD voltage. Therefore, both fast settling and low noise and ripple are achieved with an NVDD supply circuit having variable bandwidth in accordance with the teachings of the present invention.

To illustrate, FIG. 1 is a schematic illustrating one example of a pixel cell 100 with a global shutter controlled with a global shutter control signal generator 120 in accordance with the teachings of the present invention. In the example, global shutter control signal generator 120 is coupled to receive a negative NVDD voltage 130 from a supply circuit with variable bandwidth 128 in accordance with the teachings of the present invention. In the example, pixel cell 100 may be one of a plurality of pixel cells in a pixel array. As shown in the depicted example, pixel cell 100 includes a global shutter transistor 102, a photodiode 104, a transfer transistor 106, a storage transistor 108, an output transistor 110, a readout node 114, a reset transistor 112, an amplifier transistor 116, and a row select transistor 118 coupled to a bitline 178. In one example, the readout node 114 is a floating diffusion disposed in the semiconductor material of pixel cell 100. In one example, the amplifier transistor 116 is implemented with a source follower coupled transistor. As shown in the example of FIG. 1, global shutter transistor 102 is coupled between an AVDD voltage and photodiode 104.

In operation, the global shutter transistor 102 is coupled to selectively deplete the image charge that has accumulated in the photodiode 104 prior to a normal exposure operation by selectively coupling the photodiode 104 to voltage AVDD in response to a global shutter control signal $GS_{CTRL}$ 126, which is generated by global shutter control signal generator 120. In the example, all pixel cells 100 included in a pixel array of an image sensor share the global shutter control signal $GS_{CTRL}$ 126 to implement a global shutter. After the image charge in photodiode 104 has been depleted through global shutter transistor 102, the global shutter control signal $GS_{CTRL}$ 126 transitions to NVDD to switch global shutter transistor 102 into a low leakage off mode. As shown in the depicted example, negative NVDD voltage 130 is provided by the supply circuit with variable bandwidth 128. As will be discussed in greater detail below, during a first portion of the off time of global shutter transistor 102, the bandwidth of the global shutter control signal $GS_{CTRL}$ 126 is set to have a large bandwidth to provide a fast settling time. During a second portion of the off time of global shutter transistor 102, the bandwidth of the global shutter control signal $GS_{CTRL}$ 126 is set to have a small bandwidth to provide a low noise and ripple in accordance with the teachings of the present invention.

After the global shutter switch 102 has been turned off in response to global shutter control signal $GS_{CTRL}$ 126, the photodiode 104 disposed in the semiconductor material of pixel cell 100 then begins to accumulate image charge in response to incident light 122 directed to the photodiode 104 during a normal exposure operation. In one example, the incident light 122 may be directed through a front side of the semiconductor material of pixel cell 100. In another example, it is appreciated that the incident light 122 may be directed through a backside of the semiconductor material of pixel cell 100. After the normal exposure operation, the image charge that is accumulated in photodiode 104 is transferred to an input of the storage transistor 108 through transfer transistor 106.

The example in FIG. 1 also illustrates that output transistor 110 is coupled to an output of the storage transistor 108 to selectively transfer the image charge from the storage transistor 108 to readout node 114, which in the illustrated example is a floating diffusion FD. A reset transistor 112 is coupled between a reset voltage $V_{RESET}$ and the readout node 114 to selectively reset the charge in the readout node 114 in response to a reset signal RST. In the example, amplifier transistor 116 includes an amplifier gate coupled to the readout node 114 to amplify the signal on readout node 114 to output image data from pixel cell 100. Row select transistor 118 is coupled between bitline 178 and the amplifier transistor 116 to output the image data to bitline 178.

Figure 2:
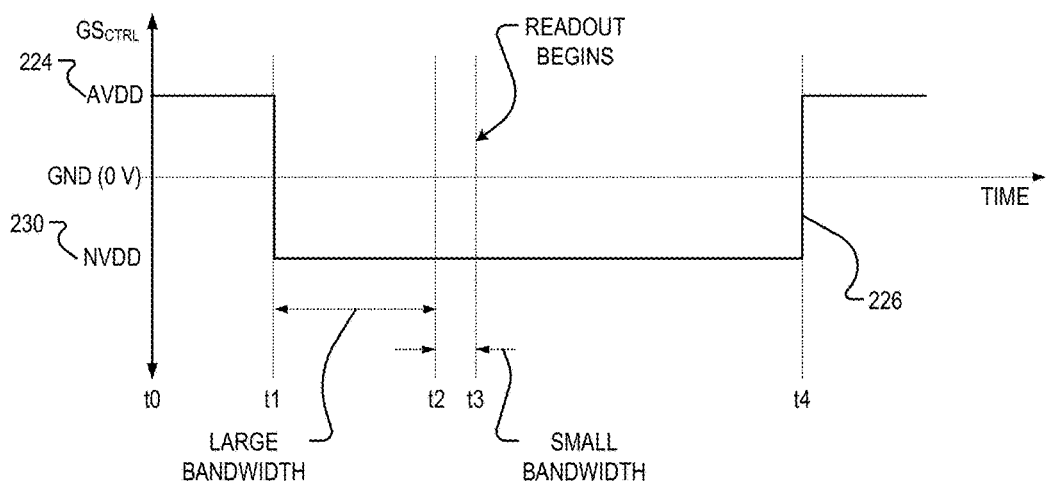
FIG. 2 is a timing diagram illustrating an example global shutter control signal with a signal value provided from a supply circuit with variable bandwidth in accordance with the teachings of the present invention.

FIG. 2 is a timing diagram illustrating an example global shutter control signal $GS_{CTRL}$ 226 having a first value AVDD 224, and a second value NVDD 230 to control a global shutter switch in accordance with the teachings of the present invention. In the depicted example, it is appreciated that global shutter control signal $GS_{CTRL}$ 226 of FIG. 2 may be one of example of global shutter control signal 126 generated by global shutter control signal generator 120 of FIG. 1, and that similarly named and numbered elements referenced below are coupled and function similar to as described above. Accordingly, elements in FIG. 1 may be also referred to below for explanation purposes.

In one example, AVDD 224 may be equal to 3 volts, and NVDD 230 is equal to −2 volts. It is appreciated of course that in other examples, AVDD 224 and NVDD 230 may have different values in accordance with the teachings of the present invention, and that the example voltages described herein are provided for explanation purposes.

As shown in the example of FIG. 2, at time t0, the global shutter control signal $GS_{CTRL}$ 226 is equal to AVDD 224, which turns on global shutter transistor 102 and resets the image charge in photodiode 104. At time t1, global shutter control signal $GS_{CTRL}$ 226 transitions from a positive AVDD 224 to NVDD 230, which turns off global shutter transistor 102 and switches global shutter transistor 102 into a low leakage off mode in which there is reduced leakage through global shutter transistor 102. As shown in the example depicted in FIG. 2, between time t1 and time t2, the NVDD 230 voltage of global shutter control signal $GS_{CTRL}$ 226 is set to have a large bandwidth, which enables faster settling times in accordance with the teachings of the present invention. Later, after time t2, the NVDD 230 voltage of global shutter control signal $GS_{CTRL}$ 226 is set to have a small bandwidth, which provides reduced noise and ripple in accordance with the teachings of the present invention. It is appreciated that when the global shutter transistor 102 is off after time t1, a normal exposure operation begins, at which time image charge may be accumulated in photodiode 104 in response to incident light 122.

In one example, the duration of time from time t1 to t2 may be approximately 80% of the time between turning off the global shutter transistor 102 at time t1, and a readout operation that begins at time t3. As such, in that example, the duration of time from time t2 to time t3 may be the remaining approximately 20% of the time before readout operation that begins at time t3.

Continuing with the example shown in FIG. 2, at time t3, the readout operation may begin, after which time transfer transistor 106 may transfer the image charge accumulated in in photodiode 104 to storage transistor 108, which may then eventually be readout through output transistor 110, amplifier transistor 116, and row select transistor 118 to bitline 178, as discussed above. In the example depicted in FIG. 2, at time t4, global shutter control signal $GS_{CTRL}$ 226 transitions from NVDD back to AVDD to turn global shutter transistor 102 back on, which reinitializes the image charge in photodiode 104 before a next normal exposure operation.

Figure 3:
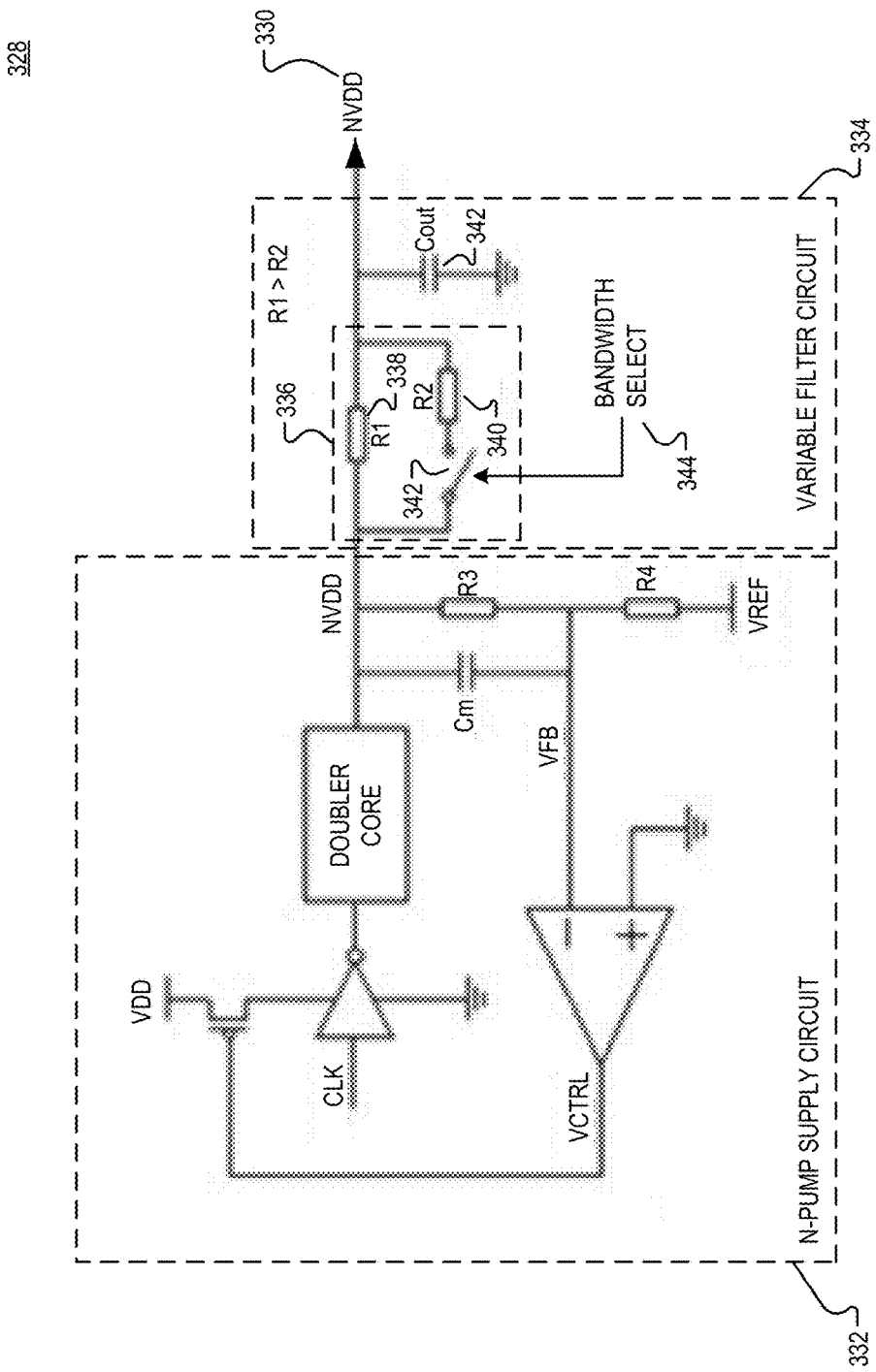
FIG. 3 is a schematic illustrating one example of a supply circuit with variable bandwidth in accordance with the teachings of the present invention.

FIG. 3 is a schematic illustrating one example of a supply circuit with variable bandwidth 328 in accordance with the teachings of the present invention. In the depicted example, it is appreciated that supply circuit with variable bandwidth 328 of FIG. 3 may be one of example of supply circuit with variable bandwidth 128 to generate NVDD 130 of FIG. 1 or NVDD 230 of FIG. 2, and that similarly named and numbered elements referenced below are coupled and function similar to as described above.

As shown in the example depicted in FIG. 3, supply circuit with variable bandwidth 328 is coupled to provide NVDD 330, which in one example is coupled to be received by global shutter control signal generator 120 of FIG. 1. In the depicted example, supply circuit with variable bandwidth 328 includes an N-pump supply circuit 332 and a variable filter circuit 334 coupled to an output of supply circuit with variable bandwidth 328 as shown.

In the example, variable filter circuit 334 is coupled to selectively vary a bandwidth of the NVDD 330 signal in response to a bandwidth select signal 344. In one example, bandwidth select signal 344 may be a digital signal, or may be controlled by a digital register, or the like. As such, variable filter circuit 334 may be coupled to selectively vary the bandwidth of the NVDD 330 signal between a first bandwidth and a second bandwidth, where the first bandwidth is larger than the second bandwidth.

In the specific example depicted in FIG. 3, the variable filter circuit 334 includes a variable RC filter circuit that is coupled to the output of the supply circuit 328 to selectively vary the bandwidth of the NVDD 330 signal between a larger bandwidth, and a smaller bandwidth in response to the bandwidth select signal 344. For example, the variable filter circuit 334 example of FIG. 3 includes a variable resistor circuit 336 and a capacitor Cout 342 coupled to the output of the supply circuit 328 to provide an RC circuit to selectively vary the bandwidth of the NVDD 330 signal in response to the bandwidth select signal 344. In the depicted example, the variable resistor circuit 336 includes a first resistor R1 338 coupled to the capacitor Cout 342, a switch 342 coupled to the first resistor R1 338 as shown, and a second resistor R2 340 coupled to the capacitor Cout 342 and the switch 342 as shown. In the example, the switch 342 is coupled to selectively couple the second resistor R2 340 across the first resistor R1 338 in parallel to vary a total resistance of the variable resistor circuit 336 to vary an RC time constant of the variable filter circuit 334 in response to the bandwidth select signal 344 in accordance with the teachings of the present invention.

In one example, the resistance of first resistor R1 338 is greater than the resistance of second resistor R2 340. In operation, when the bandwidth select signal 344 opens switch 342, second resistor R2 340 is disconnected from being coupled in parallel to first resistor R1 338, and the total resistance of variable resistance circuit 336 is therefore equal to R1. However, when the bandwidth select signal 344 closes switch 342, the second resistor R2 340 is connected across first resistor R1 338 in parallel, and the total resistance of variable resistance circuit 336 is therefore equal to R1*R2/(R1+R2). In one example, the resistance of second resistor R2 340 is less than the resistance of first resistor R1 338. As such, when switch 342 is closed (e.g., between time t1 and t2 in FIG. 2), the total resistance of variable resistance circuit 336 is smaller, and a smaller RC time constant is provided, and the first bandwidth or a larger bandwidth is provided for NVDD 330 signal. Similarly, when switch 342 is opened (e.g., between time t2 and t3 in FIG. 2), the total resistance of variable resistance circuit 336 is larger, and a larger RC time constant is provided, and the second bandwidth or a smaller bandwidth is provided for NVDD 330 signal in accordance with the teachings of the present invention.

In the example depicted in FIG. 3, the N-pump supply circuit 332 is illustrated as a negative charge pump circuit including an example doubler core that is coupled to be clocked with a clock signal CLK, and is coupled to a capacitor Cm to supply the negative NVDD 330 voltage to the variable filter circuit 334 and the output of supply circuit 328 as shown. It is appreciated that N-pump supply circuit 332 is one example of a supply circuit that can be used to generate NVDD 330 as shown, and that other types of supply circuits may be employed to provide the negative voltage NVDD 330 and enjoy the benefits of example supply circuit with variable bandwidth in accordance with the teachings of the present invention.

Figure 4:
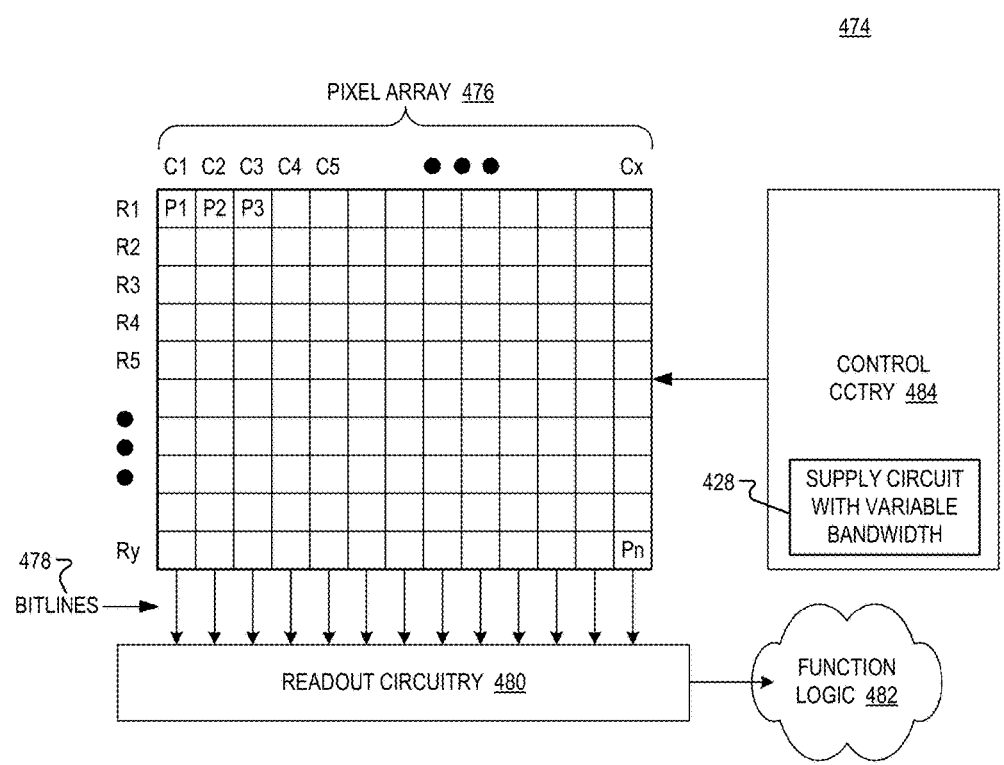
FIG. 4 is a diagram illustrating one example of an imaging system including a pixel array having pixel cells controlled with an example global shutter control signal generator in accordance with the teachings of the present invention.

FIG. 4 is a diagram illustrating one example of an imaging system 474 including a pixel array 476 having pixel cells controlled with control circuitry 484 including an example supply circuit with variable bandwidth 428 in accordance with the teachings of the present invention. In the depicted example, it is appreciated that example supply circuit with variable bandwidth 428 of FIG. 4 may be one of example of example supply circuit with variable bandwidth 128 of FIG. 1, or supply circuit with variable bandwidth 328 of FIG. 3, to generate the example NVDD 130 signal of FIG. 1, or the NVDD 230 of FIG. 2, or the NVDD 330 signal of FIG. 3, and that similarly named and numbered elements referenced below are coupled and function similar to as described above.

In particular, as shown in the example depicted in FIG. 4, imaging system 474 including an example pixel array 476 having a plurality of image sensor pixels cells. Imaging system 474 includes pixel array 476 coupled to control circuitry 484 and readout circuitry 480, which is coupled to function logic 482. In one example, pixel array 476 is a two-dimensional (2D) array of image sensor pixel cells (e.g., pixels P1, P2, P3, . . . Pn). It is noted that the pixel cells P1, P2, . . . Pn in the pixel array 476 may be examples of pixel cell 100 of FIG. 1. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell P1, P2, P3, . . . Pn has been reset in response to global shutter control signal generator circuitry, after the global shutter transistor included in each pixel cell P1, P2, P3, . . . Pn has been turned off in response to a global shutter control signal having an NVDD value generated with supply circuit with variable bandwidth 428 included in control circuitry 484, and after each pixel cell P1, P2, P3, . . . Pn has acquired its image data or image charge during a normal exposure operation, as discussed in detail above, the image data is readout by readout circuitry 480 through bitlines 478 and then transferred to function logic 482. In various examples, readout circuitry 480 may include amplification circuitry, analog-to-digital conversion (ADC) circuitry, or otherwise. Function logic 482 may simply store the image data or even manipulate the image data by applying post image effects (e.g., crop, rotate, remove red eye, adjust brightness, adjust contrast, or otherwise). In one example, readout circuitry 480 may readout a row of image data at a time along readout column lines (illustrated) or may readout the image data using a variety of other techniques (not illustrated), such as a serial readout or a full parallel readout of all pixels simultaneously.

In the depicted example, control circuitry 484 is coupled to pixel array 476 to control operational characteristics of pixel array 476. As discussed in detail above, control circuitry 484 includes an example supply circuit with variable bandwidth 428 to supply the negative NVDD signal of the global shutter control signal. The control circuitry 484 also generate the other control signals to control image acquisition for each pixel cell included in pixel array 476. In the example, the global shutter control signal and other control signals simultaneously enable all pixels cells P1, P2, P3, . . . Pn within pixel array 476 to acquire image charge and transfer the image charge from each respective photodiode in the pixel cells during a single acquisition window in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A pixel cell, comprising:
 a photodiode disposed in a semiconductor material to accumulate image charge in response to incident light directed to the photodiode;
 a global shutter transistor disposed in the semiconductor material and coupled to the photodiode to selectively reset the image charge in the photodiode in response to a global shutter control signal;
 a global shutter control signal generator circuit coupled to generate the global shutter control signal to have a first value signal or a second value signal, wherein the first value of the global shutter control signal is coupled to turn on the global shutter transistor to reset the photodiode, wherein the second value of the global shutter control signal is coupled to control the global shutter transistor to be in a low leakage off mode; and
 a supply circuit coupled to provide the second value signal to the global shutter control signal generator circuit, wherein the supply circuit includes a variable filter circuit coupled to an output of the supply circuit to selectively vary a bandwidth of the second value signal in response to a bandwidth select signal, wherein the variable filter circuit is coupled to selectively vary the bandwidth of the second voltage signal between a first bandwidth and a second bandwidth, wherein the first bandwidth is larger than the second bandwidth.

2. The pixel cell of claim 1, wherein the variable filter circuit includes a variable RC filter circuit coupled to the output of the supply circuit to selectively vary the bandwidth of the second value signal in response to the bandwidth select signal.

3. The pixel cell of claim 1, wherein the variable filter circuit includes a variable resistor circuit and a capacitor coupled to the output of the supply circuit to selectively vary the bandwidth of the second value signal in response to the bandwidth select signal.

4. The pixel cell of claim 3, wherein the variable resistor circuit comprises:
 a first resistor coupled to the capacitor;
 a switch coupled to the first resistor; and
 a second resistor coupled to the capacitor and the switch, wherein the switch is coupled to selectively couple the second resistor across the first resistor in parallel to vary a total resistance of the variable resistor circuit to vary an RC time constant of the variable filter circuit in response to the bandwidth select signal.

5. The pixel cell of claim 1, wherein the supply circuit further comprises an N-pump supply circuit coupled to provide the second value signal.

6. The pixel cell of claim 1, wherein the first value signal is a positive voltage, and wherein the second value signal is a negative voltage.

7. The pixel cell of claim 1 further comprising a storage transistor disposed in the semiconductor material to store the image charge accumulated in the photodiode.

8. The pixel cell of claim 7 further comprising a transfer transistor disposed in the semiconductor material and coupled between the photodiode and the storage transistor to selectively transfer the image charge from the photodiode to the storage transistor.

9. The pixel cell of claim 8 further comprising an output transistor disposed in the semiconductor material and coupled to the storage transistor to selectively transfer the image charge from the storage transistor to a readout node.

10. The pixel cell of claim 9 wherein the readout node comprises a floating diffusion disposed in the semiconductor material.

11. The pixel cell of claim 9 further comprising:
 a reset transistor disposed in the semiconductor material and coupled to the readout node;
 an amplifier transistor disposed in the semiconductor material having an amplifier gate coupled to the readout node; and
 a row select transistor disposed in the semiconductor material coupled between a bitline and the amplifier transistor.

12. An imaging system, comprising:
 a pixel array of pixel cells, wherein each one of the pixel cells includes:

a photodiode disposed in a semiconductor material to accumulate image charge in response to incident light directed to the photodiode;

a global shutter transistor disposed in the semiconductor material and coupled to the photodiode to selectively reset the image charge in the photodiode in response to a global shutter control signal;

a global shutter control signal generator circuit coupled to generate the global shutter control signal to have a first value signal or a second value signal, wherein the first value of the global shutter control signal is coupled to turn on the global shutter transistor to reset the photodiode, wherein the second value of the global shutter control signal is coupled to control the global shutter transistor to be in a low leakage off mode; and a supply circuit coupled to provide the second value signal to the global shutter control signal generator circuit, wherein the supply circuit includes a variable filter circuit coupled to an output of the supply circuit to selectively vary a bandwidth of the second value signal in response to a bandwidth select signal, wherein the variable filter circuit is coupled to selectively vary the bandwidth of the second voltage signal between a first bandwidth and a second bandwidth, wherein the first bandwidth is larger than the second bandwidth;

control circuitry coupled to the pixel array to control operation of the pixel array; and readout circuitry coupled to the pixel array to readout image data from the plurality of pixels.

13. The imaging system of claim 12 further comprising function logic coupled to the readout circuitry to store the image data from each one of the plurality of pixel cells.

14. The imaging system of claim 12, wherein the variable filter circuit includes a variable RC filter circuit coupled to the output of the supply circuit to selectively vary the bandwidth of the second value signal in response to the bandwidth select signal.

15. The imaging system of claim 12, wherein the variable filter circuit includes a variable resistor circuit and a capacitor coupled to the output of the supply circuit to selectively vary the bandwidth of the second value signal in response to the bandwidth select signal.

16. The imaging system of claim 15, wherein the variable resistor circuit comprises:
a first resistor coupled to the capacitor;
a switch coupled to the first resistor; and
a second resistor coupled to the capacitor and the switch, wherein the switch is coupled to selectively couple the second resistor across the first resistor in parallel to vary a total resistance of the variable resistor circuit to vary an RC time constant of the variable filter circuit in response to the bandwidth select signal.

17. The imaging system of claim 12, wherein the first value signal is a positive voltage, and wherein the second value signal is a negative voltage.

18. The imaging system of claim 12, wherein each one of the pixel cells further comprises:
a storage transistor disposed in the semiconductor material to store the image charge accumulated in the photodiode;
a transfer transistor disposed in the semiconductor material and coupled between the photodiode and the storage transistor to selectively transfer the image charge from the photodiode to the storage transistor;

an output transistor disposed in the semiconductor material and coupled to the storage transistor to selectively transfer the image charge from the storage transistor to a readout node;

a reset transistor disposed in the semiconductor material and coupled to the readout node;

an amplifier transistor disposed in the semiconductor material having an amplifier gate coupled to the readout node; and a row select transistor disposed in the semiconductor material coupled between a bitline and the amplifier transistor.

19. A method for controlling a global shutter of a pixel cell, comprising:
turning on the global shutter transistor in response to a global shutter control signal coupled to be received by a gate terminal of the global shutter transistor to reset image charge in a photodiode coupled to the global shutter transistor;

turning off the global shutter transistor in response to the global shutter control signal to enable the photodiode to accumulate image charge in response to incident light directed to the photodiode during a normal exposure operation, wherein turning off the global shutter transistor comprises:
setting the global shutter control signal to have a larger bandwidth for a first portion of time that the global shutter transistor is turned off; and
setting the global shutter control signal to have a smaller bandwidth for a second portion of time that the global shutter transistor is turned off,
wherein setting the global shutter control signal to have the larger bandwidth comprises setting a variable filter circuit coupled to output the global shutter control signal to have the larger bandwidth, and wherein setting the global shutter control signal to have the smaller bandwidth comprises setting the variable filter circuit to have the smaller bandwidth; and transferring the image charge out of the photodiode; and
turning on the global shutter transistor in response to the global shutter control signal after the image charge has been transferred out of the photodiode.

20. The method of claim 19 wherein setting the global shutter control signal to have the larger bandwidth comprises setting a variable resistance included in a variable filter circuit coupled to output the global shutter control signal to have a smaller resistance, and wherein setting the global shutter control signal to have the smaller bandwidth comprises setting the variable resistance included in the variable filter circuit to have a larger resistance.

21. The method of claim 20 wherein setting the variable resistance included in the variable filter circuit to have the smaller resistance comprises closing a switch to couple a second resistor in parallel with a first resistor, and wherein setting the variable resistance included in the variable filter circuit to have the larger resistance comprises opening the switch to decouple the second resistor from being coupled in parallel to the first resistor.

22. The method of claim 19 wherein turning off the global shutter transistor in response to the global shutter control signal coupling a negative voltage to the gate terminal of the global shutter transistor to provide a low leakage off mode with the global shutter transistor.

* * * * *